Patented Oct. 12, 1954

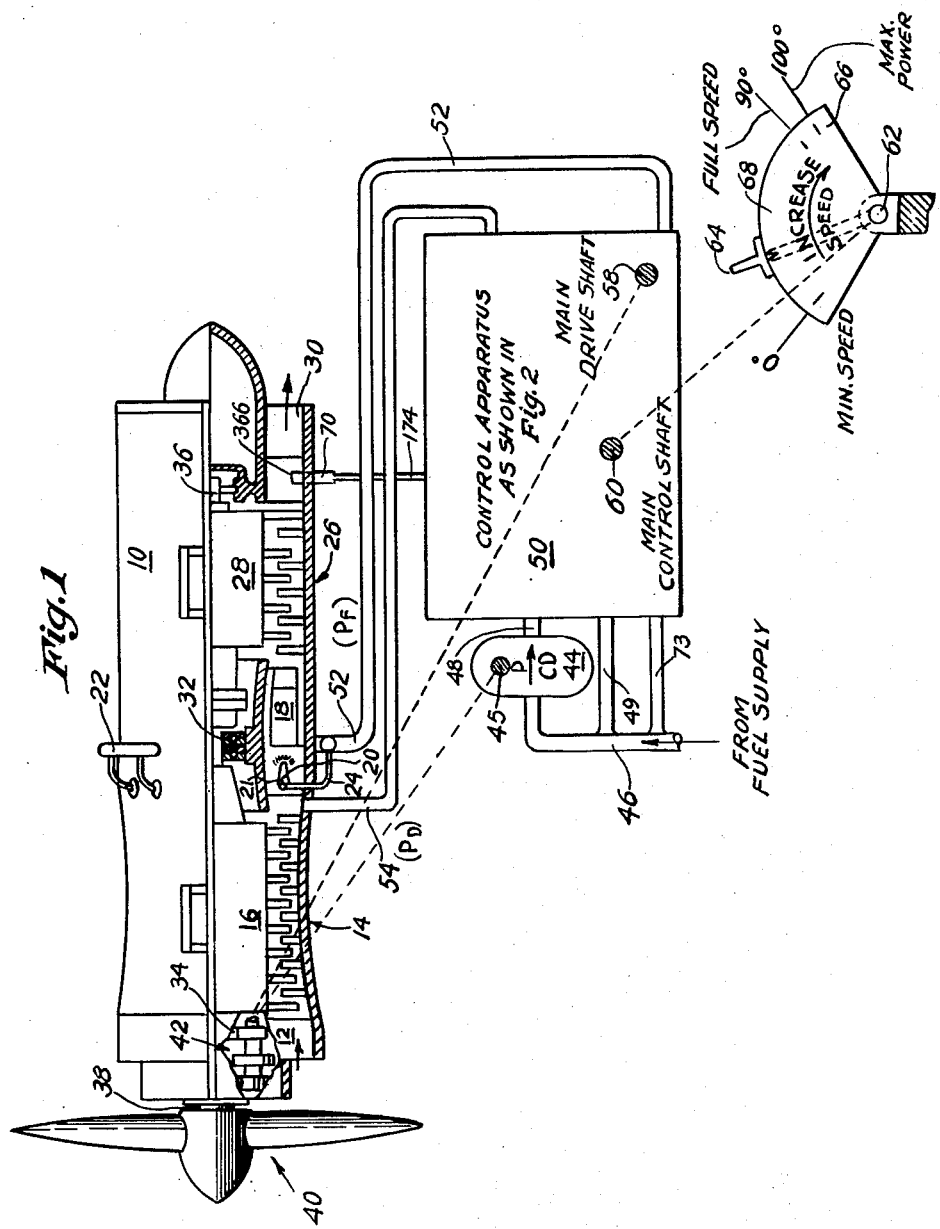

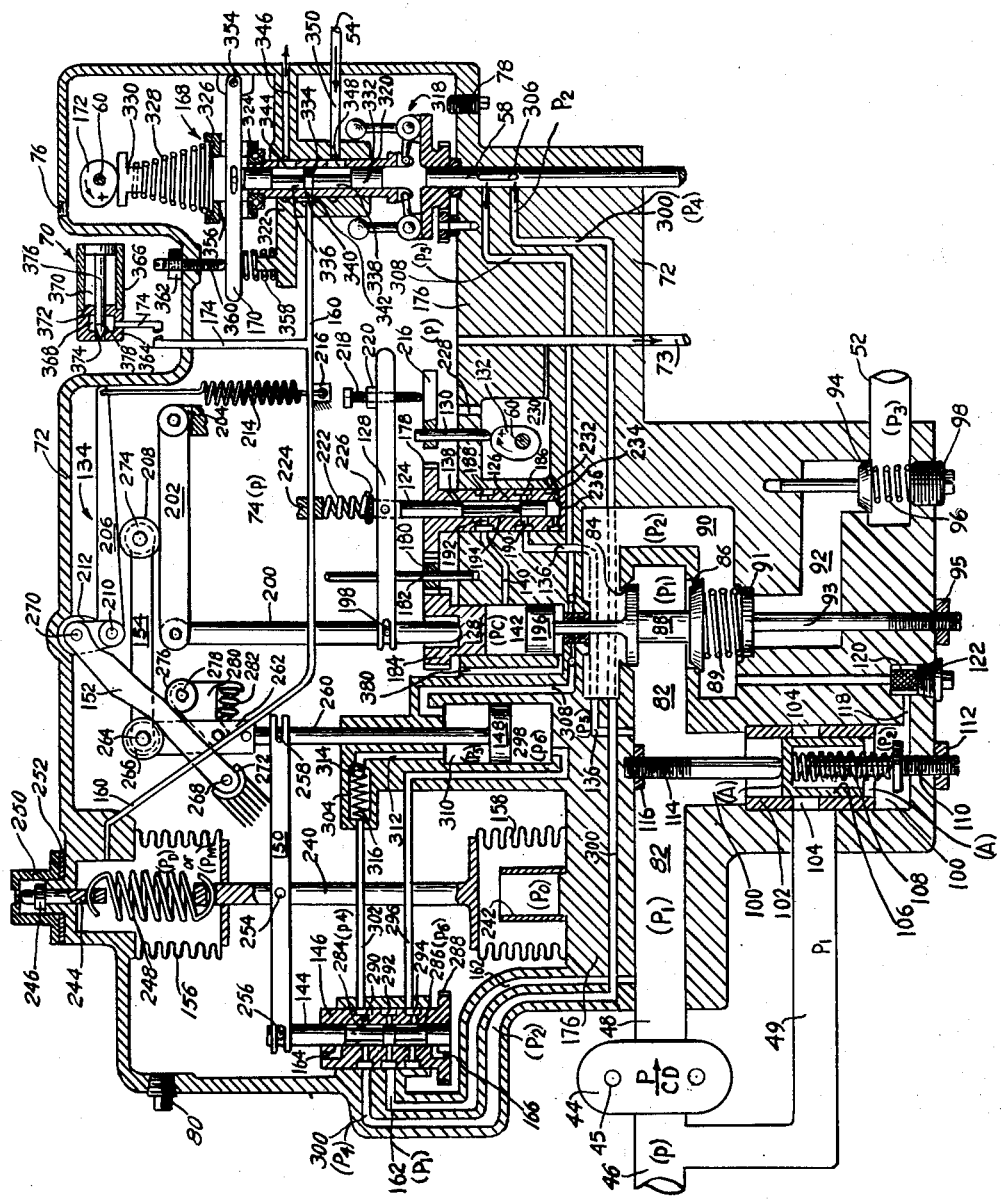

2,691,268

UNITED STATES PATENT OFFICE 2,691,268

FUEL AND SPEED CONTROL APPARATUS FOR INTERNAL-COMBUSTION ENGINES

Augustin M. Prentiss, Hartford, Conn., assignor to Niles-Bement-Pond Company, West Hartford, Conn., a corporation of New Jersey Application January 14, 1949, Serial No. 71,007

38 Claims. (Cl. 60—39.28)

This invention relates to fuel and speed control apparatus for internal combustion engines and is more particularly applicable to gas turbine and jet engines suitable for propeller-propulsion, jet-propulsion, or propeller-and-jet propulsion of aircraft. Such engines usually include an air inlet, an air compressor, one or more combustion chambers, a gas turbine, and a tail pipe for discharging combustion gases to the atmosphere. Associated with the engine is a fuel system including a fuel pump for delivering fuel to the combustion chambers. My invention concerns apparatus to control the engine speed and power by controlling the fuel delivery as a function of several variables including engine speed, engine temperature, other engine operating conditions, and manual control.

Owing to structural and metallurgical restrictions, engines of the type referred to may not be safely operated at speeds or temperatures exceeding predetermined limiting values, but for maximum economy of operation, both speed and temperature of the engine must be maintained at or near these values. On the other hand, engine speed is a critical factor in flight performance or aircraft and an engine may not be used at maximum allowable speed in all flight maneuvers, at all flight speeds, or under all flight conditions. In multiple engine installations, it is often preferable to operate one or more engines at substantially full speed and power while variations in the total power output are obtained by controlling that of one engine, rather than to operate all engines at correspondingly reduced speed and power. Fuel control apparatus must be provided which enables the operator to vary the engine speed as desired for a minimum value at starting speed and minimum power to the predetermined limiting speed and full power. The control of engine temperature is preferably a substantially automatic function of the fuel control apparatus.

The value of engine speed corresponding to any given value of fuel flow varies as a function of the altitude of flight, flight speed, air density at the engine air inlet, engine torque, fuel quality and a wide variety of other factors. For precise regulation of engine speed, or to avoid excessive temperatures, therefore, it is not feasible to rely solely upon automatic regulation of fuel flow as a function of variables which exclude engine speed and temperature.

Objects of my invention are:

(1) To provide improved fuel and speed control apparatus for an internal combustion engine employing four component coordinated fluid pressure systems for regulating the fuel delivery, said systems being respectively responsive to manual control and to engine pressure, temperature, and speed conditions;

(2) To provide in such apparatus improved cam and lever mechanism for modifying the operation of the manual system by the pressure responsive systems;

(3) To provide improved pressure regulating and pressure responsive control elements which may be used in fluid pressure apparatus such as above described;

(4) To provide a simplified fuel and speed control apparatus, wherein all of the control elements operate coordinately to control a single flow regulating valve which functions under a constant pressure head and varies the fuel flow by varying the opening through said valve;

(5) To provide apparatus such as described, wherein the liquid fuel is utilized as the principal operating fluid of the control elements, thus eliminating the necessity for separate oil pressure systems heretofore employed;

(6) To provide an improved arrangement of external connections to such apparatus including a main drive shaft for simultaneously rotating the several control elements, and a speed governor means, and a main control shaft having adjacently thereon a pair of cams for operation of the manual and speed control systems;

(7) To provide in such apparatus improved means for controlling acceleration and deceleration of the engine as a function of the pressure responsive system; and (8) To provide improved means responsive to the control shaft for predetermining the engine speed including adjustable means for preselecting a maximum value of speed independently of operation of the control shafts.

Other objects and advantages of my invention will become apparent from a consideration of the appended specification, claims, and drawings, in which:

Figure 1 shows, somewhat diagrammatically, an engine suitable for propeller-and-jet propulsion of aircraft, together with its associated fuel and speed control apparatus and engine control lever; there being also shown principal connections between the engine and a diagrammatic illustration of the fuel and speed control apparatus of Fig. 2;

Figure 2 shows, also somewhat diagrammatically, fuel and speed control apparatus embodying the principles of my invention.

Figure 1

Referring to the drawing, Fig. 1, there are shown the principal elements of the engine above referred to, a supporting casing 10, an air inlet 12, a multistage compressor 14, a compressor rotor shaft 16, one each of a number of combustion chambers 18, one of a corresponding number of fuel discharge nozzles 20 connected to a generally circular manifold 22 by means of a conduit 24; a multistage turbine 26, a turbine rotor shaft 28 connected to the compressor rotor shaft 16, a tail pipe 30 for discharging combustion gases from turbine 26; a center bearing 32 and end bearings 34 and 36 supported by casing 10, a propeller shaft 38 to which is fixed a propeller 40, and a gear train 42 connecting shafts 16 and 38 for rotating propeller 40 at a speed proportional to engine speed and for operating the fuel pump and other accessories. Construction of a jet engine used solely for jet propulsion is similar to that of the engine of Fig. 1 except for omission of the propeller and propeller shaft and corresponding modification of the gear train. Since, in a jet engine, the power developed by the turbine is used only for operating the compressor and accessories, single-stage rather than multi-stage turbine construction is generally employed.

A fuel pump 44 is connected to a pump inlet conduit 46 leading from a source of fuel supply (not shown) and to a pump discharge conduit 48. Fuel flows from the indicated source of supply through inlet conduit 46, pump 44, and pump discharge conduit 48, fuel control apparatus 50, and conduit 52 to manifold 22 in the engine. Pump 44 is of the high pressure, constant delivery type and is operated by a drive shaft 45 connected to gear train 42 in the engine, or any other suitable source of power.

In each of the discharge nozzles 20 there is a series of fixed slots, one of which is indicated at 21, through which fuel enters the nozzles from conduits 24. The fuel flow from the nozzles is directly proportional to the effective area of slots 21 and is a square root function of the drop across the slots between the pressure in conduits 24, which is substantially equal to the pressure ($p_F$) in conduit 52, and the pressure in the combustion chamber. It follows, therefore, that the fuel delivery to the combustion chamber is a function of the pressure ($p_F$) in conduit 52 which is controlled by fuel control apparatus 50 as hereinafter described.

When it is desired to limit the range of fuel pressure so that its value at maximum fuel flow is less than that corresponding to the square root function of the drop across slots 21, the nozzles may be provided with auxiliary slots supplied by another manifold connected to conduit 52 through a pressure-responsive flow-divider which opens at a predetermined value of the pressure ($p_F$). In this manner the pressure ($p_F$) may be maintained sufficiently high to produce satisfactory nozzle discharge without requiring the control apparatus to operate under unfavorable pressure conditions at maximum flow.

The control apparatus of Fig. 2, diagrammatically shown in Fig. 1, is connected to a source of compressor discharge pressure ($p_D$) in the engine by a conduit 54 and, as subsequently explained, the control apparatus is responsive to the absolute compressor discharge pressure ($p_D$) which is an indication of air flow through the engine. The value of ($p_D$) increases as the engine speed increases, as flight speed increases, and as the altitude of flight or entering air temperature decreases, and is also a function of the compressor characteristics.

A main drive shaft 58 in the control apparatus is driven by the engine at a speed proportional to engine speed and a main control shaft 60 is rotatable in response to movement of a shaft 62 to which is fixed an engine control lever 64. Control lever 64 is manually operable in reference to a scale 68 on a fixed quadrant 66, scale 68 being calibrated in terms of R. P. M. engine speed.

Figure 2

Referring to Fig. 2, there is shown, somewhat diagrammatically, an embodiment of my invention, all principal elements of which, except a thermal control 70, are enclosed in a casing 72 having external connections with conduit 54 for supplying air to the apparatus at the compressor discharge pressure ($p_D$), with conduit 48 for supplying fuel under high pressure to the control apparatus, with conduit 49 for the return of excess fuel to the inlet conduit 46, and with conduit 73 for the return of fuel from the interior of casing 72 to the source of fuel supply (not shown). Casing 72 as shown in the drawing is of continuous cross-section but for purposes of manufacture and assembly may be made in an equivalent form comprising two or more separable elements secured to each other by bolts and gaskets in the conventional manner.

The control apparatus of Fig. 2 is a self-contained fluid pressure system employing the interior of casing 72 as a reservoir 74 which is maintained approximately full of liquid fuel at the pressure ($p$) in order to permit the working elements to operate in a liquid bath and which is vented at a threaded port 76 to the fuel supply source. If desired, reservoir 74 may be made a part of the oil system of the engine. In this case, a pair of plugs 78 and 80, otherwise serving as drain plugs, are removed from casing 72 and the respective casing openings are then connected by suitable inlet and outlet conduits to the engine oil system. Also, the lower end of drain conduit 73 is plugged and conduits 138, 164, 166 and 380 (described hereinafter) are connected by drain pipes to the fuel supply source.

Fuel pump 44 draws liquid fuel under a low pressure ($p$) (e. g. 10 pounds per square inch) from a supply source (not shown) through inlet conduit 46 and discharges said fuel under a high pressure ($p_1$) (e. g. 50–600 pounds per square inch) through discharge conduit 48 into a passageway 82 in the lower part of casing 72. Passageway 82 communicates through orifices 84 and 86, controlled by a balanced valve 88, with a chamber 90 which is connected by a passageway 92 to fuel discharge conduit 52 leading to fuel nozzles 20 in combustion chamber 18. A check valve 94 at the junction of passageway 92 and conduit 52 is biased toward its seat by a spring 96 and adjustable plug 98 and maintains a small (e. g. 20 pounds per square inch) constant pressure drop ($p_2 - p_3$) between the fuel in passageway 92 and conduit 52 and prevents the escape of fuel from chamber 90 when the engine is not in operation and insures that the pressure ($p_2$) in chamber 90 will never be less than the pressure ($p$) in inlet conduit 46. Valve 88 is biased toward its seat by a spring 89.

Communicating with passageway 82 is a branch passageway 100 in which is seated a valve sleeve 102 having a plurality of ports 104 which communicate with conduit 49 leading to fuel inlet conduit 46. Mounted in sleeve 102 is a piston valve 106 which is biased in a closing direction by a spring 108 seated on an adjustable stem 110 and locked in adjusted position by a lock nut 112. Stem 110 extends toward the upper end of spring 108 so as to limit the maximum downward travel of valve 106. A similar stem 114 is adjustably mounted in passageway 100 above valve 106 so as to limit the upward travel of valve 106 and is locked in adjusted position by a lock nut 116. A small passageway 118 connects chamber 90 with passageway 100 at a point below valve 106 so that the pressure acting in an upward direction on valve 106 is always the same as the pressure ($p_2$) in chamber 90. A filter 120, seated on an adjustable plug 122, in passageway 118 prevents any particles of dirt in the fuel in chamber 90 from entering valve sleeve 102 and causing valve 106 to bind or stick.

Since the upper and lower areas (A) of valve 106 are equal, the net force acting in said valve is equal to the fuel pressure differential ($p_1-p_2$), times the area (A) of valve 106, minus the force (S) of spring 108. Hence, the fuel pressure differential ($p_1-p_2$) = $S/A$, and since (A) is constant, the fuel pressure differential ($p_1-p_2$) is proportional to the force (S) of spring 108, which is determined by the adjustment of stem 110. In practice, the tension of spring 108 is adjusted to maintain a fuel pressure differential ($p_1-p_2$) of approximately 20 pounds per square inch which is always constant, irrespective of the variation in inlet pressure ($p_1$) which may vary between wide limits (i. e., 50–600 pounds per square inch), depending upon the conditions of operation of the engine. Thus, the fuel metering head on valve 88 is always constant under all conditions of operation, and the rate of fuel flow to the engine is determined by the degree of opening of valve 88. When the fuel discharged by pump 44 is more than that required by the engine, as determined by the opening of valve 88, the excess fuel is returned to the inlet side of the pump through valve 106 and conduit 48. In order to insure a close control of the pressure differential ($p_1-p_2$), valve ports 104 are preferably made elliptical in shape with their major axes horizontal, so that the opening of ports 104 by valve 106 is an elliptical function of the travel of said valve.

The control apparatus comprises four mechanically and hydraulically cooperative component systems, as briefly outlined in the immediately following numbered paragraphs, for regulating the variable control pressure ($p_c$) which acts on valve 88 to control the full flow to the engine, namely:

(1) A manual control system principally including a main servo valve 124, a main servo valve sleeve 126, a main power piston 128, a main floating lever 128, a push rod 130, and a cam 132 fixed to the main control shaft 60, for rendering pressure ($p_c$) variable by movement of the engine control lever 64, Fig. 1. Also included in the manual control system, as set forth herein, is a lever mechanism 134 comprising a pair of levers 202 and 206, a circular bearing 208 between said levers, a spring 214, and a rod 200 for loading piston 128 with a force due to spring 214. Fluid flows discontinuously to the manual control system through a conduit 136 connected to main fuel passageway 82 and is drained from the manual control system through an outlet passage 138 opening into reservoir 74 at the upper end of valve sleeve 126. The variable control pressure ($p_c$) is transmitted from the manual control system through a conduit 140 which is connected to control cylinder 142.

(2) A barometric control system principally including a barometric servo valve 144, a barometric servo valve sleeve 146, a barometric power piston 148, a barometric floating lever 150, a fixed elongated barometric cam 152, a positioning bar 154 for varying the position of bearing 208, and a pair of bellows 156 and 158, the former being connected to a conduit 160 and the latter being evacuated to zero pressure ($p_0$) and sealed. The control pressure ($p_c$) is made a function of the absolute compressor discharge pressure ($p_D$) by transmission of movement of piston 148 through cam 152, and positioning bar 154, of lever mechanism 134 to the main power piston 128 in the manual control system. Fluid flows discontinuously to the barometric control system from the main fuel passageway 82 through a conduit 162 and is drained from the barometric control system through one or the other of two outlet passages 164 and 166 in sleeve 146, which passages open into reservoir 74.

(3) A speed control system principally including a governor valve mechanism generally indicated at 168, a valve setting lever 170 and a cam 172 on the main control shaft 60. In this system, the control pressure ($p_c$) is made a function of the engine speed by modifying movement of the floating lever 150 of the barometric control system in response to modification of the compressor discharge pressure in bellows 156 as a function of the engine speed.

(4) A thermal control system including the thermal control 70 for overriding the speed control system as a function of the engine temperature. Normally, there is no flow of fluid through the thermal control system, but when the predetermined limiting or maximum allowable temperature is exceeded air flows from conduit 160, successively through a connecting conduit 174, past a control valve in thermal control 70, to the outside atmosphere. This reduces the compressor discharge pressure in bellows 156, as a function of engine temperature, in the same manner as the speed control mentioned above, whenever the engine temperature exceeds a maximum allowable limit.

*Manual control system*

A wall 176 separates the reservoir 74 from the fuel flow channels 82, 90 and 92 and is suitably bored or otherwise machined for housing and operation therein of some elements of the component control systems previously defined.

In the manual control system, a gear 178 is provided at the top of main servo valve sleeve 126 for rotation of the sleeve in wall 176, sleeve 126 being installed with gear 178 above wall 176 and having its upper end extending somewhat beyond the upper side of the wall. Gear 178 and hence sleeve 126 are rotated by another gear 180 fixed to a shaft 182 which in turn is driven from the main drive shaft 58 through a suitable connection (not shown). Similarly, a gear 184 is provided at the upper end of piston 128 which is both slidably and rotatably operable in wall 176 and is installed with gear 184 above the wall. Gear 184 is rotated by gear 180. Any other means of suitably rotating sleeve 126 and piston 128 may be employed, the purpose of such rotation being to avoid sticking of the main servo valve 124 in sleeve 126 and to prevent sticking of the piston 128 in wall 176.

Valve sleeve 126 is provided with a pair of parallel circumferential grooves 186 and 188 and one or more corresponding ports 190 and 192 drilled radially at the horizontal centers of the grooves. The upper end of conduit 136 opens opposite groove 186 and ports 190 are therefore continuously supplied with fluid at pressure ($p_1$). Groove 188 and ports 192 are similarly connected to the upper end of a passage 140 which communicates with cylinder 142.

Valve 124 is undercut to form an annular chamber 194 and has a neutral position as shown in Fig. 2 in which the lower edge of the undercut is alined with the upper edge of port 190, and the upper edge of the undercut is alined with the lower edge of outlet passage 138. Ports 192 communicate with chamber 194 regardless of the position of valve 124 in its normal range of operation. When valve 124 is displaced downward so that port 190 opens into chamber 194, a path for flow is provided which successively includes conduit 136, groove 186, ports 190, chamber 194, ports 192, groove 188, passage 140, and an expansible chamber 142 included between the lower end of piston 128 and the upper end of piston 196. The value of the variable control pressure ($p_c$) in chamber 142 is thus increased upon downward movement of valve 124 from its neutral position. Similarly, when valve 124 is displaced upward so that chamber 194 opens into outlet passage 138, a path for flow is provided from chamber 142, through passage 140, groove 188, ports 192, chamber 194 and outlet passage 138 to reservoir 74, the pressure ($p_c$) being thereby decreased.

The left-hand end of main floating lever 128 has a pin-and-slot connection 198 with rod 200 which has a self-alining connectin at its lower end with the bored interior of piston 128 so that upward movement of the piston lifts rod 200 and simultaneously allows angular displacement of the rod with respect to the piston without causing the latter to bind in wall 176. The upper end of rod 200 is hinged to the left-hand end of lever 202 in mechanism 134, lever 200 having its right-hand end hinged to a fixed support 204. Above lever 202, mechanism 134 includes the lever 206 which has its left-hand end hinged at a pin 210 fixed in a support 212 above and approximately on the centerline of piston 128. The right-hand end of lever 206 is connected to tension spring 214 which has its lower end anchored in a fixed support 216. A measure of the downward force of spring 214 is transmitted from lever 206 to lever 202 through the circular bearing 208 the position of which is regarded as fixed in the present discussion. Piston 128 is subjected to an upward force proportional to the differential ($p_c-p$) between the respective pressures in chamber 142 and reservoir 74 and to a measure of the downward force of spring 214 which is transmitted to the piston through lever mechanism 134 and rod 200. The rate of spring 214 is high, so that the value of the differential ($p_c-p$) and hence the variable control pressure ($p_c$) may vary throughout a wide range of values corresponding to a relatively narrow range of movement of the piston which is positioned to maintain the forces acting thereon in equilibrium.

Main floating lever 128 is positioned by: (1) push rod 130 which carries an arm 216 engaging an adjusting screw 218 threaded through lever 128 and locked in place by means of a nut 220; (2) rod 200 which serves as a pivotal support for the left-hand end of lever 128; and (3) a light spring 222 compressed between a fixed support 224 and a retainer 226 supported by the upper end of valve 124, which causes the adjusting screw 218 and hence lever 128 to follow movement of push rod 130 as the latter is actuated by cam 132. It is noted from the above that, excepting the substantially negligible force due to spring 222, the main servo valve 124 does not directly effect the position of lever 128 but instead is positioned by the lever, there being equal and opposite forces proportional to pressure ($p$) on both ends of valve 124, by virtue of communication between reservoir 74 and the bottom end of sleeve 126, through passageway 228, chamber 230, passageway 232, groove 234 and ports 236. When considering the manual control system only, the position of bearing 208 and hence the downward force of rod 200, corresponding to any given position of piston 128, is regarded as fixed. In the neutral position of servo valve 124, as shown in Fig. 2, the manual control system is in a state of equilibrium; i. e., there is no flow of fluid in the system, the pressure ($p_c$) in chamber 142 is such as to maintain piston 128 in a position corresponding to the position of cam 132, with valve 124 in neutral (closed) position, and so that the fuel flow through valve 88 corresponds with the value of pressure ($p_c$) trapped in the system by closure of servo valve 124.

Upon clockwise movement of control lever 64, Fig. 1, and consequent clockwise movement of main control shaft 60 and cam 132, lever 128 moves clockwise about connection 198 and servo valve 124 is depressed from its neutral position. Consequently, as previously explained, the value of control pressure ($p_c$) and hence the fuel flow to the engine increase. Control pressure ($p_c$) continues to increase until piston 128 responds by raising lever 128 and valve 124 a sufficient amount to restore said valve to its neutral position, following which no further change occurs in the manual control system as long as the position of shaft 60 remains undisturbed. Similarly, upon counter-clockwise movement of control lever 64, Fig. 1, and corresponding counter-clockwise movement of shaft 60 and cam 132, lever 128 moves counter-clockwise about its connection with rod 200 and servo valve 124 is elevated above its neutral position. In this case, as previously explained, the value of control pressure ($p_c$) and hence the fuel flow decrease, continuing to do so until piston 128 responds by lowering rod 200 and lever 128 to a new position at which servo valve 124 is again restored to its neutral position. When servo valve 124 is in its neutral position, the value of control pressure ($p_c$), and hence the fuel flow, is determined by the position of control shaft 60 for a given fixed position of bearing 208 in lever mechanism 134.

As stated earlier, the engine speed corresponding to any given value of fuel flow varies as a function of entering air density, flight speed, and other factors over which the manual control system has no control and to which it is unresponsive. It follows, therefore, that the manual control system provides a means of regulating the variable control pressure ($p_c$) from minimum to maximum values corresponding to a predetermined range of clockwise movement of the engine control lever 64, Fig. 1, and depending upon the downward force transmitted by rod 200 to piston 128.

*Barometric control system*

The operation of lever mechanism 134 and positioning bar 154 and their relation to rod 200 is explained in the following description of the barometric control system and in subsequent explanations of coordinated functions of the barometric and other component systems.

In the barometric control system, the upper end of bellows 156 is fixed inside casing 72 directly over bellows 158 which is of substantially the same effective area and which has its lower end fixed to a portion of wall 176. A rod 240 rigidly connects the free ends of the bellows to each other so that expansion or contraction of either is accompanied by an equal and opposite movement of the other. A cylindrical stop 242 is provided to limit contraction of bellows 158. Inside bellows 156 and at its upper end there is an adjustable spring support 244 the position of which can be varied as desired by means of a nut 246. Between the lower end of support 244 and the upper end of rod 240 there is a tension spring 248 for biasing the bellows and rod assembly upward in opposition to the differential pressure $(p_D-p_0)$. A cover 250 and a gasket 252 are provided for enclosing support 244 and nut 246 which, upon removal of cover 250, are accessible from the exterior of the casing. The barometric lever 150 is hinged at approximately the mid-point of its length on a pin 254 in rod 240, the left end of the lever being connected to the upper end of barometric valve 144 by means of a pin-and-slot connection 256 which permits vertical movement of valve 144 in sleeve 146 as the angular position of lever 150 changes. The right-hand end of lever 150 has a pin-and-slot connection 258 with a rod 260 fixed to the barometric power piston 148. The upper end of rod 260 above its connection with lever 150 is hinged to a link 262 which is pivotally connected to the left end of positioning bar 154 by means of a pin 264 on which turns a roller 266 engaged with the fixed barometric cam 152. The position of cam 152 is fixed by a pair of pins 268 and 270 respectively fitted into fixed supports 272 and 212. The cam is slidable on the pins so that it can be removed from the apparatus for replacement or any other desired purpose. The right-hand end of positioning bar 154 has a pin 274 fixed therein on which the circular bearing 208 is mounted. Roller 266 is held in contact with the upper surface of cam 152 by means of another roller 276 which is rotatable on a pin 278 fixed in a triangular bracket 280. Bracket 280 is pivoted to link 262 and a spring 282, compressed between the link and one side of the bracket, holds roller 276 against the lower side of cam 152. Thus, as rod 260 moves in a vertical direction, link 262 follows so that roller 266 remains in engagement with the contoured upper face of cam 152. Both vertical and angular movement are imparted to link 262 in this process so that: when piston 148 and rod 260 descend, bearing 208 is moved leftward and the downward force on main power piston 128 due to spring 214, is increased; and, similarly, when piston 148 and rod 260 rise, bearing 208 is moved rightward and the downward force on the main power piston 128 is decreased.

The barometric servo valve 144 is undercut to provide a pair of annular chambers 284 and 286 between the valve and sleeve 146 in which the valve is slidable. The vertical position of valve sleeve 146 in reference to casing 72 is fixed and the sleeve is rotated by means of a gear 288 driven from main drive shaft 58 through a suitable connection (not shown). The valve sleeve has three pairs of ports, 290, 292 and 294.

In all operating positions of valve 144, ports 290 open into the annular chamber 284 and ports 294 open into the annular chamber 286. Fluid in chambers 284 and 286 is maintained at pressures designated $(p_4)$ and $(p_6)$, respectively, as later explained.

Ports 292 are just closed when valve 144 is in its neutral position, as shown in the drawing, the width of the ports being substantially equal to the width of the valve land between the lower end of chamber 284 and the upper end of chamber 286. The outlet passage 166 in sleeve 146 is also just closed by the land at the lower end of valve 144 and outlet passage 164 is similarly just closed by the land at the upper end of valve 144, when the latter is in its neutral position.

Ports 292 are connected to the end of conduit 162 so that the ports 292 are continuously supplied with fluid at pressure $(p_1)$. Ports 294 are connected to one end of a conduit 296 which has its other end connected to an expansible chamber 298 below piston 148. Ports 290 are connected to a pair of conduits 300 and 302. Conduit 302 is connected to a check valve chamber 304 in wall 176 above the barometric power piston 148, for transmitting the pressure $(p_4)$ to chamber 304 from chamber 284. Conduit 300 is supplied with fluid from chamber 284 at pressure $(p_4)$ and is intermittently connected by means of a slot 306 on main drive shaft 58 to a conduit 308 for supplying fluid at a pressure $(p_5)$ to a chamber 310 above piston 148. Slot 306 intermittently connects conduits 300 and 308 as it rotates and is descriptively referred to as a "chopper" valve. It serves to restrict flow between conduits 300 and 308. The area of slot 306 is substantially greater than that of an equivalent fixed restriction between the two conduits. A number of parallel slots may be substituted for the single slot 306, if desired.

When the barometric servo valve 144 is elevated above its neutral position, fluid is permitted to flow from annular chamber 284 through outlet 164 to reservoir 74, thereby reducing the pressure $(p_4)$ in conduit 300 and $(p_5)$ in conduit 308. Simultaneously, fluid is permitted to flow from conduit 162, through port 292, chamber 286, and conduit 296 to chamber 298, thereby increasing the pressure $(p_6)$ in chamber 298.

When valve 144 is depressed below its neutral position, fluid is permitted to flow from conduit 162 through port 292, and chamber 284, to conduits 300 and 308, thereby increasing the pressure $(p_4)$ in conduit 300 and $(p_5)$ in conduit 308. Simultaneously, fluid flows from chamber 286 through outlet 166 to reservoir 74, thereby reducing the value of pressure $(p_6)$ in conduit 296 and chamber 310.

The position of rod 240, and hence the position of pin 254, is determined by the pressure differential $(p_D-p_0)$ acting on bellows 156 and 158 and by spring 248, there being a different predetermined position of the pin for each value of the differential, at any given fixed position of spring support 244. In steady state operation, when the barometric servo valve 144 is in its neutral position, as shown, the positions of the power piston 148 and of rod 260 are predetermined by the position of fulcrum pin 254 and the pressure differential $(p_6-p_5)$ acting on piston 148. This differential has a substantially constant value when the barometric control system is in equilibrium, and equals zero when the apparatus is constructed so that no force is required to maintain bearing 208 in any fixed position corresponding to a fixed position of pin 254.

The barometric control system varies the position of power piston 148 and rod 260 to maintain servo valve 144 in its neutral position as the position of fulcrum pin 254 changes in response to changes in the value of the differential ($p_D - p_0$). The barometric control system therefore positions bearing 268 as a function of the barometric pressure differential. The power for positioning bearing 268 is supplied by the hydraulic system. The downward load on main power piston 128 due to spring 214 is therefore modified in accordance with the barometric pressure differential.

Chamber 310 is connected to check valve chamber 304 by a conduit 312 for flow from chamber 310, past a ball check valve 314 into chamber 330, when the pressure ($p_5$) exceeds pressure ($p_4$) in chamber 284 by a small amount predetermined by a spring 316 which loads the valve. The check valve prevents reverse flow from chamber 284 to conduit 312 at all times.

Considering the barometric control system independently of the manual control and other component control systems, when a condition of equilibrium is distributed by an increase in compressor discharge pressure ($p_D$), or in the modified compressor discharge pressure ($p_M$) (hereinafter described), rod 248 and fulcrum pin 254 are lowered to a new position. The right-hand end of barometric floating lever 150 is not affected until pressure changes produced by the valve 144 cause movement of piston 148. Downward movement of pin 254 causes downward movement of the servo valve 144 and consequent increase of pressure ($p_4$) in chamber 284 and conduits 302 and 300 as previously explained, and also decrease of pressure ($p_6$) in chamber 286, conduit 296, and chamber 298 below power piston 148. Increase of pressure ($p_4$) in conduit 300 produces a flow through chopper valve 306, resulting in a corresponding increase in pressure ($p_5$) in chamber 310 above the power piston. The rate of change of pressure ($p_5$) is a function of chopper valve 306. As the differential ($p_5 - p_6$) increases, the barometric power piston 148 moves downward, thereby turning lever 150 clockwise on fulcrum pin 254 and moving servo valve 144 upwards toward its neutral position. The downward movement of piston 148 and rod 260 continues until the neutral position of valve 144 is restored and rod 260 is in a new position corresponding to the neutral position of the valve and the new lower position of pin 254. When equilibrium occurs, pressures ($p_5$) and ($p_6$) are again substantially constant.

In the above train of events, the particular value acquired by the differential ($p_5 - p_6$) in restoring valve 144 to its neutral position is not important, since all that is required is that the position of rod 260 corresponds to the neutral position of the valve. If movement of rod 260 is opposed by frictional or other forces, the control operates to vary the differential ($p_5 - p_6$) sufficiently to compensate such forces. During the process, check valve 314 remains seated, since the pressure ($p_5$) cannot increase above the pressure ($p_4$).

When the compressor discharge pressure ($p_D$ or $p_M$) decreases, with the barometric control system in an initial state of equilibrium, rod 248 and pin 254 rise causing clockwise movement of lever 150 about its pivotal connection with rod 260 and raising the servo valve 144 above its neutral position. As previously explained, pressures ($p_4$) and ($p_5$) decrease and pressure ($p_6$) increases, thereby causing piston 148, rod 260 and the right-hand end of lever 150 to move upwardly so that the servo valve 144 moves downward toward its neutral position. During this process, decrease in the value of pressure ($p_4$) allows check valve 314 to move leftward, thereby allowing fluid to flow from chamber 310 so that pressure ($p_5$) decreases more rapidly than would be permitted by reversed flow from conduit 308 through chopper valve 306. Hence, rod 260 moves upwardly (in a fuel flow decreasing direction) more rapidly than it moves downwardly (in a fuel flow increasing direction). Equilibrium of the barometric control system is restored with valve 144 in its neutral position, with fulcrum pin 254 in a new higher position, with rod 260 in a corresponding new higher position in which the upward and downward forces on the rod are in equilibrium, and with check valve 314 again seated. As is apparent from the drawing, when movement of fulcrum pin 254 displaces the brometric servo valve 144 in either direction from its neutral position, the barometric power piston 148 is required to move approximately twice as far in the same direction to restore the valve to its neutral position.

Speed control system

Governor valve mechanism 168 includes a flyball speed responsive device 318 operated by the main drive shaft 58 for varying the vertical position of governor valve sleeve 320 as a function of engine speed. The valve sleeve operates in a suitably bored projection 322 of casing 72. The inner race of a ball bearing assembly 324 is fastened to the upper end of sleeve 320 and the outer race of bearing assembly 324 supports a lower governor spring retainer 326 which is slotted so that lever 170 and retainer 326 are independently movable in relation to each other in a vertical plane. When cam 172 on main control shaft 60 is rotated counter-clockwise, it compresses a governor spring 328 between lower retainer 326 and an upper governor spring retainer 330 which is forced upward by spring 328 against the cam 172.

Cam 172 is actuated by movement of the engine control lever 64, Fig. 1, for varying the position of the upper governor spring retainer 330, and hence for varying the load of spring 328 on valve sleeve 320 in opposition to the upward force of the speed responsive device 318. In the particular embodiment shown, the downward force of governor spring 328 varies substantially directly with the spring deflection, while the upward force due to speed responsive device 318 is proportional to the square of the engine speed. When these forces are in equilibrium, there is no vertical movement of sleeve 320. Cam 172 is generated so that as manual control lever 64 is advanced clockwise throughout a predetermined range in reference to the uniformly calibrated R. P. M. scale 68, Fig. 1, the deflection of spring 328 is varied at a non-uniform rate so that the speed required to produce a state of equilibrium increases in accordance with the scale value corresponding to the position of the lever.

Slidably mounted in sleeve 320 is a servo valve 332 having upper and lower lands connected to a center land 334 by reduced portions which define annular chambers 336 and 338 in sleeve 320. The width of land 334 is such as to just cover a port 340 in sleeve 320 when said land and port are in alignment. Port 340 communicates through an annular groove 342 in projection 322 with conduit 160 leading to the interior of bellows 156 in all operating positions of sleeve 320. Chamber 336 communicates through a slot 344 in sleeve 320 and a passageway 346 with the outside atmosphere. Chamber 338 communicates through a slot 348 in sleeve 320 with a conduit 350 which connects with conduit 54 from the compressor discharge chamber of the engine. Valve setting lever 170 pivoted at 354 to casing 72 has a pin-and-slot connection to valve sleeve 320 and passes through a slot 356 in seat 326 which is of sufficient width and height to permit free movement of seat 326 and sleeve 320 with respect to lever 170. Lever 170 is held in an adjusted position by spring 358 and adjusting screw 360 which is threaded through the casing 72 and locked in position by lock nut 362. The setting of lever 170 determines the position of valve 332 and hence the point in the travel of sleeve 320 at which land 334 commences to open port 340.

Whenever the downward force of spring 328 equals the upward thrust of the governor fly-ball arms on sleeve 320, as when the engine speed corresponds to the R. P. M. called for by the position of manual control lever 64, sleeve 320 is in its equilibrium position, with port 340 directly opposite and just covered by land 334, as shown in Fig. 2. The speed control system 168 is then cut-out, and the fuel feed to the engine is responsive only to the barometric and thermal control systems. If now the force of spring 328 is increased by a counter-clockwise rotation of cam 172 in response to a movement of control lever 64 to the right, or the upward thrust of the governor fly-balls is reduced by an extraneous reduction in engine speed, so that the force of spring 328 exceeds the upward thrust of the governor fly-balls, sleeve 320 descends, progressively uncovering port 340. This permits compressed air under compressor discharge pressure ($p_D$) to flow through conduit 54, passageway 350, chamber 338, port 340 and conduit 160 to the interior of bellows 156, increasing the downward thrust of said bellows on rod 240 and lever 150, with resulting increase in fuel flow to the engine, as has been previously described. The increased fuel flow causes the engine speed to increase until the R. P. M. again corresponds to that called for by the position of control lever 64, whereupon the upward thrust of the governor fly-balls again equals the force of spring 328, land 334 closes port 340, and speed control system 168 is restored to equilibrium.

Whenever the upward thrust of the governor fly-balls exceeds the downward force of spring 328, as when cam 172 is rotated clockwise by a movement of control lever 64 to the left and reduces the compression in spring 328, or the upward thrust of the governor fly-balls is increased by an extraneous increase in engine speed, sleeve 320 moves upwardly, uncovering port 340, which permits compressed air to escape from the interior of bellows 156, through conduit 160, port 340, chamber 336 and conduit 346 to the outside atmosphere. This reduces the pressure in bellows 156, and the downward thrust of said bellows on rod 240 and lever 150, with resulting decrease in fuel flow to the engine, as previously described. The resultant decrease in engine speed continues until the R. P. M. again corresponds to that called for by the position of control lever 64, whereupon the upward thrust of the governor fly-balls equals the force of spring 328, land 334 closes port 340, and the speed control system 168 is restored to equilibrium.

From the foregoing, it is apparent that the pressure in bellows 156 may vary from a maximum pressure equal to the compressor discharge pressure ($p_D$) to a minimum equal to atmospheric pressure ($p_A$), depending upon the action of the speed control system. Since the pressure inside bellows 156 can never exceed the compressor discharge pressure ($p_D$), the design and adjustment of bellows 156 must be such that with a pressure ($p_D$), it exerts a sufficient force on the barometric control system to bring the engine to its maximum rated speed when the manual control lever is in its extreme right-hand position. Under ordinary conditions of engine operation, the pressure in bellows 156 will have a value ($p_M$) equal to the average between ($p_D$) and ($p_A$), both of which vary with engine operating and flight conditions. Thus, both ($p_D$) and ($p_A$) vary directly with speed of flight, and inversely with altitude of flight and atmospheric temperature. ($p_D$) also varies with engine speed and temperature and compressor characteristics.

*Coordination of the manual and speed control systems*

Both cam 132 in the manual control system and cam 172 in the speed control system are fixed to control shaft 60 for simultaneous operation as control lever 64, Fig. 1, is advanced clockwise through the predetermined range. In the embodiment shown, the total range of movement of lever 64 is approximately 100°.

In a condition of steady state operation at constant speed and constant fuel flow, the positions of all movable elements in both the manual and the speed control systems are fixed (except in respect to rotation of the valve sleeves and main power piston 128), main servo valve 124 and governor valve sleeve 320 are in their neutral positions, pressures ($p_M$) and ($p_c$) are substantially constant, and as previously explained and shown in Fig. 2, the right end of main floating lever 128 is supported by finger 216.

When control lever 64 is advanced clockwise from the position shown in Fig. 1 to another position within the first 90° range of movement of the lever, the lift of cam 132 decreases, push rod 130 is lowered, and the right end of main floating lever 112 follows the push rod. Simultaneously, with movement of cam 132 however, cam 172 also turns counterclockwise to compress spring 328. The downward force of spring 328 is thus increased and governor valve sleeve 320 is depressed from its neutral position in respect to land 334 of valve 332 so that compressed air flows from conduit 54 through conduit 350, and port 340 to the interior of bellows 156, thereby increasing pressure ($p_D$ or $p_M$) in bellows 156. Servo valve 144 and consequently piston 148 move downward, depressing main floating lever 128, thereby moving main servo valve 124 below its neutral position and producing increased pressure in chamber 142, with consequent opening of valve 88 and increasing fuel flow and engine speed, as previously explained.

The amount of movement of the right end of lever 128 is limited by the movement of push rod 130, so that manually operated cam 132 determines the position of the right end of lever 128. The fuel flow to the engine corresponding to a given position of the engine control lever is thereby rendered maximum during acceleration of the engine. The maximum fuel flow during periods of acceleration is determined by the position of control lever 64 acting through cam 132, and not by the difference between actual speed and desired speed. This limitation of the fuel flow during acceleration is necessary to prevent overheating of the engine.

As the engine speed increases, governor valve sleeve 320 continues to rise until the engine speed attains the desired speed corresponding to the position of lever 64, whereupon port 340 is closed by valve 332. Simultaneously, the increasing pressure ($p_c$) in chamber 142 causes piston 128 to rise to a new position, corresponding to the new position of push rod 130 and finger 216, which returns valve 124 to its neutral position, whereupon the whole control apparatus is restored to equilibrium and a steady state of engine operation ensues.

When control lever 64 is retarded in a counter-clockwise direction from one position to another in the 0°–90° range of lever movement, reversal of the above process takes place. Simultaneously, with upward movement of push rod 130, cam 172 reduces the deflection and load of governor spring 328 and governor valve sleeve 320 rises to permit the escape of compressed air at pressure ($p_M$) from bellows 156, through conduit 160, port 340, past valve 334, through port 344 and conduit 346 to the outside atmosphere. Pressure ($p_M$) is thereby reduced and servo valve 144 and piston 148 rise. The rise of piston 148 decreases the force of spring 214 on power piston 128 so that piston 128 also rises, elevating the left end of lever 128. At the same time, the elevation of push rod 130 and finger 216 raises the right end of lever 128, so that main servo valve 124 is raised. This reduces the pressure in chamber 142, permitting piston 196 to rise and move valve 88 in a closing direction, thereby decreasing fuel flow and engine speed.

With the position of control lever 64 fixed, the engine speed may vary owing to variations in fuel quality, combustion temperatures, or other factors over which the barometric or thermal control systems may or may not have control.

When, under such circumstances, the engine speed increases without any change in position of control lever 64, valve sleeve 320 is raised from its neutral position in respect to land 334 of valve 332 and, as previously shown, pressure ($p_M$) is thereby decreased. The main power piston rises and the process of reducing the variable control pressure ($p_c$), fuel flow, and hence engine speed, follows, until the desired value of speed is restored. When the engine speed decreases at a fixed position of the control lever, the process of increasing the fuel flow to restore the desired value of engine speed is substantially the reverse of the process which occurs upon overspeeding.

As control lever 64 is moved between its 90° and 100° quadrant positions, the throw of cam 172 remains substantially constant at a maximum value. The engine speed therefore has a substantially constant maximum value when the lever is in its 90°–100° range of travel. Within this range, however, the throw of cam 132 continues to increase to a maximum value corresponding to the extreme or 100° position of lever travel. Response of the combined manual and speed control systems to movement of the control lever in this ten-degree range is similar to that in cases previously explained in which the fuel flow and engine speed vary as a function of both the manual and speed control systems, except that the speed control system is effective to override the manual control system to a relatively greater extent in order to maintain a substantially constant maximum value of speed. As the fuel flow is increased at constant maximum engine speed, the engine torque and hence the brake-horsepower increase, the maximum brake-horsepower being developed at the 100° lever position. Alternatively, if desired, the throw of cam 172 may be made to increase throughout the 100° range of lever movement.

*Coordination of the manual, barometric, and speed control systems*

The manual, barometric and speed control systems cooperate to regulate the fuel flow and engine speed as a function of manual control, compressor discharge pressure ($p_D$), and engine speed. The operation of the manual controy system was previously explained on the assumption of a fixed position of circular bearing 208 in lever mechanism 134. The barometric and speed control systems vary the position of bearing 208, thereby varying the downward force on main power piston 123 and hence varying the value of the variable control pressure ($p_c$) in chamber 142 and the opening of valve 88.

As bearing 208 moves leftward, corresponding to downward movement of the barometric power piston 148 produced by an increase of the compressor discharge pressure ($p_D$ or $p_M$), the force transmitted by the bearing from spring 214 and lever 206 to lever 202 and rod 200 is increased so that the value of pressure ($p_c$) corresponding to the position of main control shaft 60 increases. Conversely, as bearing 208 moves rightward, corresponding to decrease of the pressure ($p_D$ or $p_M$), the pressure ($p_c$) decreases.

It is thus seen that the value of the variable control pressure ($p_c$) corresponding to any given position of the manual control lever 64, Fig. 1, depends upon the barometric control system, the pressure ($p_c$) increasing as the pressure ($p_D$ or $p_M$) in bellows 156 increases, as when the engine speed increases, the speed of flight increases, or as the altitude of flight decreases.

Since the compressor discharge pressure ($p_D$) increases as the engine speed increases, it follows that the barometric control system controls the rate of acceleration when the engine control lever is advanced. On movement of the lever, within the first 90° range of operation, from one position to another corresponding to a higher rate of speed, the initial value of the pressure ($p_c$) corresponds to the initial value of the pressure ($p_D$ or $p_M$) and to the initial lever position. The increase of pressure ($p_c$) due to movement of the manual control is relatively rapid, but the corresponding increase due to increase of the pressure ($p_D$ or $p_M$) occurs only as the engine speed increases and as the barometric and speed control systems respond to such speed increase. The barometric control system thus serves to control acceleration and deceleration of the engine.

When the entering air density increases as a function of increasing speed and decreasing altitude of flight, bearing 208 moves leftward to increase the pressure ($p_c$) and the fuel flow as above explained. Conversely, as the flight speed decreases and the altitude increases, the compressing discharge pressure ($p_D$) or ($p_M$) decreases and bearing 208 moves rightward to decrease the pressure ($p_c$). The barometric control is sometimes descriptively referred to as the altitude control, and cam 152 is customarily contoured with closer regard to altitude compensation than to acceleration control, particularly since the latter is accomplished to some extent by chopper valve 306.

The contour of the barometric cam 152 is made to provide a desired position of bearing 208 for every value of the compressor discharge pressure ($p_M$). In steady state operation, in which the temperature control system is ineffective and the control apparatus is in equilibrium, the fuel flow is dependent upon: (1) the manual and barometric control systems; and (2) the speed control system which overrides these combined systems to reduce the fuel flow, as previously explained.

Thermal control system

The thermal control system is essentially a means for overriding the manual control system to reduce the fuel flow and engine speed when a predetermined limiting value of temperature is exceeded.

Thermal control 70, as shown in Fig. 2, includes a body 364 on which is fixed a thin walled tube 366 which has its right-hand end closed. Body 364 is provided with a pair of chambers 368 and 370, separated by an apertured wall 372. Chamber 368 is connected to conduit 174 and is provided with an aperture 374 to the outside of control device 70. A rod 376 is fixed to the closed right-hand end of tube 366, is slidably operable in the apertured wall 372 on which tube 366 is assembled. The left-hand end of rod 376 is contoured as a valve 378 which is normally seated in aperture 374 to prevent flow from chamber 368. Tube 366 and rod 376 are made from materials having substantially different coefficients of thermal expansion, so that when the tube and rod are heated, the tube expands faster than the rod, the thermal control generally being made so that the valve remains closed until the predetermined limiting temperature is exceeded. The control is installed with tube 366 exposed to the engine temperature, as in the tail pipe 30 of the engine of Fig. 1. Then, when the tail pipe temperature exceeds the limiting value, the valve opens to permit the flow of compressed air from conduit 174 through chamber 368, past valve 378 to the outside atmosphere. The pressure ($p_D$ or $p_M$) in conduits 174, 160 and the interior of bellows 156, is decreased as valve 378 opens.

When valve 374 in thermal control 70 is closed, the pressure in conduits 174, 160 and the interior of bellows 156 is maintained at pressure ($p_D$ or $p_M$), but when the limiting engine temperature is exceeded, valve 378 opens and compressed air escapes from bellows 156, at a rate corresponding to the degree of excess temperature, with corresponding reduction of the pressure ($p_D$ or $p_M$) therein. This decrease in pressure ($p_D$ or $p_M$) causes a decrease of the value of the control pressure ($p_c$), as previously explained, and the fuel flow and engine speed are decreased below the values corresponding to the manual control setting. The flow remains at its decreased rate until the engine temperature is reduced to or slightly below the limiting value, whereupon thermal control valve 374 closes and normal operation is resumed.

The thermal control used in the fuel control apparatus need not necessarily be the particular type shown, since any temperature responsive device functionally equivalent to control 70 may be employed if desired.

The manner in which the manual and barometric control systems are coordinated in order to control the pressure ($p_c$) and the fuel flow as joint functions of the engine control lever and the compressor pressure differential is apparent from the foregoing. The speed and thermal control systems are shown to be override controls for preventing excessive engine speed and temperature.

Fuel valve 88 is rigidly attached to piston 196 so that the degree of opening through fuel ports 84 and 86 is proportional to the downward travel of piston 196. Since valve 106 maintains a constant metering head on valve 88, regardless of variations in pressures ($p_1$) and ($p_2$), the rate of fuel flow to the engine is a function of the position of valve 88, as determined by piston 196, which in turn is controlled by control pressure ($p_c$). The lower end of cylinder 142 below piston 196 is vented to reservoir 74 by conduit 380, so that the lower side of piston 196 is subjected to the substantially constant pressure ($p$) in reservoir 74. At the same time, the upper end of piston 128 (which is of the same effective area as the lower end of piston 196) is also subjected to the pressure ($p$) in reservoir 74. Since the upward thrust of pressure ($p$) on piston 196 is always balanced by the downward thrust of pressure ($p$) on piston 128, the net effect of pressure ($p$) on the control pressure ($p_c$) in chamber 142 is nil.

The force of spring 89 which biases valve 88 towards its seat, is varied by a movable seat 91 which is perforated to permit maximum unrestricted fuel flow and is raised or lowered by an adjusting screw 93, threaded through the bottom wall of casing 72 and locked in adjusted position by a lock nut 95. Spring 89 is adjusted so as to permit valve 88 to commence to open when control pressure ($p_c$) in chamber 142 is at its minimum value, corresponding to the condition of engine operation which requires the minimum fuel flow. The calibration of spring 89 is such as to cause valve 88 to vary the opening through ports 84 and 86 in a predetermined ratio to the control pressure ($p_c$) in chamber 142, so that the rate of fuel flow is in accordance with a predetermined ratio to control pressure ($p_c$). Since the control pressure ($p_c$) is regulated by the combined actions of the manual control, barometric control, speed control and temperature control systems, it follows that the fuel flow to the engine, and hence engine speed, is controlled by the position of the manual control lever and is compensated by the barometric, speed, and temperature control systems for variations in engine operating conditions.

The terms and expressions used herein are employed for purposes of description and not of limitation, and I have no intention, in the use of such terms and expressions, of excluding any equivalents of the features shown and described or portions thereof, but recognize that various modifications are possible within the scope of the invention claimed.

I claim:

1. For an internal combustion engine having a manual control lever, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, means responsive to changes in barometric pressure for modifying the opening of said valve in accordance with said changes, so as to prevent variations in engine speed due to variations in barometric pressures, and means for varying the opening of said valve in accordance with any movement of said lever, whereby the rate of fuel flow to said engine and engine speed is determined by said lever in any operating position thereof.

2. A fuel control apparatus as in claim 1, having means, responsive to the speed of said engine, for varying the opening of said valve so that the rate of fuel flow to said engine is modified in accordance with engine speed.

3. A fuel control apparatus as in claim 2, wherein said speed responsive means includes means to adjust the rate of fuel flow to said engine so that the speed of said engine coincides with a selected speed, corresponding to any operating position of said control lever, and is substantially constant under steady engine operating conditions.

4. A fuel control apparatus as in claim 2, wherein said speed responsive means includes means to limit the fuel flow to said engine so that said speed cannot exceed a selected maximum limit, regardless of the position of said control lever.

5. A fuel control apparatus as in claim 4, having means, responsive to the movement of said control lever, for increasing the fuel flow to said engine, beyond the flow corresponding to said selected maximum engine speed, so that the torque and power output of said engine may be further increased by moving said control lever, without exceeding said maximum speed.

6. A fuel control apparatus as in claim 1, having means, responsive to an air pressure in said engine, for varying the opening of said valve so that the rate of fuel flow to said engine is modified in accordance with variations in said air pressure.

7. A fuel control apparatus as in claim 6, wherein said air pressure responsive means includes means to adjust the rate of fuel flow to said engine so that the speed of said engine corresponds to any operating position of said control lever, and is substantially constant, irrespective of variations in said air pressure.

8. A fuel control apparatus as in claim 1, having means, responsive to atmospheric density immediately outside said engine, for varying the opening of said valve so that the rate of fuel flow to said engine is modified in accordance with variations in said density.

9. A fuel control apparatus as in claim 8, wherein said density responsive means includes means to adjust the rate of fuel flow to said engine so that the speed of said engine corresponds to any operating position of said control lever, and is substantially constant, irrespective of variations in said density.

10. A fuel control apparatus as in claim 1, wherein said valve is a balanced disc valve of the poppet type.

11. A fuel control apparatus as in claim 2, having means, responsive to a temperature in said engine, for varying the opening of said valve so that the rate of fuel flow to said engine is modified in accordance with said temperature.

12. A fuel control apparatus as in claim 11, wherein said temperature responsive means includes means to limit the fuel flow to said engine so that said temperature can never exceed a predetermined maximum limit under any engine operating conditions.

13. A fuel control apparatus as in claim 11, wherein said temperature responsive means includes means to limit the fuel flow to said engine so that the speed of said engine cannot exceed a speed which causes said temperature to rise above a selected maximum limit, regardless of the position of said control lever.

14. A fuel control apparatus as in claim 2, having means, responsive to an air pressure in said engine, for varying the opening of said valve, irrespective of the position of said manual control lever, so that the rate of fuel flow to said engine is always modified in accordance with variations in said air pressure, whereby said engine speed coincides with a selected speed corresponding to any selected position of said control lever, and is substantially constant, irrespective of variations in said air pressure and in other engine operating conditions which tend to vary engine speed.

15. A fuel control apparatus as in claim 1, having means, responsive to an air pressure in said engine and to atmospheric density immediately outside said engine, for varying the opening of said valve so that the rate of fuel flow to said engine is modified in accordance with variations in said air pressure and atmospheric density, whereby said engine speed coincides with a selected speed corresponding to any selected position of said control lever, and is substantially constant, irrespective of variations in said air pressure and atmospheric density which tend to vary engine speed.

16. A fuel control apparatus as in claim 2, having means, responsive to atmospheric density immediately outside said engine, for varying the opening of said valve so that the rate of fuel flow to said engine is modified in accordance with said density, whereby said engine speed coincides with a selected speed, corresponding to any selected position of said control lever, and is substantially constant, irrespective of variations in said density and in other engine operating conditions which tend to vary engine speed.

17. A fuel control apparatus as in claim 2, having means, responsive to a temperature in said engine, for varying the opening of said valve so that the rate of fuel flow to said engine is modified in accordance with said temperature, whereby said engine speed coincides with a selected speed, corresponding to any selected position of said control lever, and is substantially constant, irrespective of variations in said temperature and other engine operating conditions which tend to vary engine speed.

18. A fuel control apparatus as in claim 6, having means, responsive to a temperature in said engine, for varying the opening of said valve so that the rate of fuel flow to the engine is modified in accordance with variations in said air pressure and said temperature, whereby said engine speed coincides with a selected speed, corresponding to any selected position of said control lever and is substantially constant, irrespective of variations in said air pressure and said temperature.

19. A fuel control apparatus as in claim 1, having means, responsive to engine speed, to an air pressure in said engine, to atmospheric density immediately outside said engine, and to a temperature in said engine, for varying the opening of said valve so that the rate of fuel flow to the engine is modified in accordance with variations in said engine speed, said air pressure, said atmospheric density and said temperature, whereby said engine speed coincides with a selected speed, corresponding to any selected position of said control lever, and is substantially constant, irrespective of variations in said air pressure, said atmospheric density, said temperature, and other engine operating conditions which tend to vary engine speed.

20. A fuel control apparatus according to claim 1 wherein said control lever acts on said valve through the medium of fuel supplied by said fuel pump.

21. A fuel control apparatus according to claim 2, wherein said speed responsive means acts on said valve through the medium of fuel supplied by said fuel pump.

22. A fuel control apparatus according to claim 6, wherein said air pressure responsive means acts on said valve through the medium of fuel supplied by said fuel pump.

23. A fuel control apparatus according to claim 8, wherein said atmospheric density responsive means acts on said valve through the medium of fuel supplied by said fuel pump.

24. A fuel control apparatus according to claim 11, wherein said temperature responsive means acts on said valve through the medium of fuel supplied by said fuel pump.

25. A fuel control apparatus as in claim 14, wherein said speed responsive means acts on said valve through the medium of said air pressure responsive means.

26. A fuel control apparatus as in claim 15, wherein said atmospheric density responsive means and said air pressure responsive means act on said valve through the medium of a combined operating mechanism.

27. A fuel control apparatus as in claim 18, wherein said temperature responsive means acts on said valve through the medium of said air pressure responsive means.

28. A fuel control apparatus as in claim 19, wherein said engine speed responsive means, said air pressure responsive means, said atmospheric density responsive means and said temperature responsive means, all act on said valve through the medium of a common pressure chamber in said apparatus which is supplied with fuel by said fuel pump.

29. A fuel control apparatus as in claim 28, including means for coordinating the actions of said engine speed responsive means, said air pressure responsive means, said atmospheric density responsive means, said temperature responsive means, and said manual control lever, to create a combined control pressure in said chamber, which pressure regulates the opening of said valve, so that the fuel flow to said engine and consequent engine speed are controlled by any selected position of said lever, and said engine speed is substantially constant, irrespective of variations in said air pressure, said atmospheric density, said temperature and other conditions of engine operation which tend to vary engine speed, at any selected position of said control lever.

30. For an internal combustion engine having a manual control lever, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to engine speed, for varying the opening of said valve so that said speed is maintained at a constant value, corresponding to any operating position of said control lever, irrespective of varying engine operating conditions which affect said speed.

31. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to the rate of air flow through said engine, for varying the opening of said valve so that the rate of fuel flow bears a predetermined ratio to the rate of said air flow under varying engine operating conditions.

32. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to an air pressure in said engine, for varying the opening of said valve so that the rate of fuel flow is modified in accordance with variations in said pressure and thereby compensated for such variations.

33. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to the density of the air entering said engine, for varying the opening of said valve so that the rate of fuel flow is modified in accordance with variations in said density and thereby compensated for such variations.

34. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to a temperature in said engine, for varying the opening of said valve so that the rate of fuel flow is modified in accordance with variations in said temperature, whereby said temperature cannot exceed a predetermined maximum safe value.

35. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to engine speed, for varying the opening of said valve so that the rate of fuel flow is regulated in accordance with engine speed and limited so that said speed cannot exceed a predetermined maximum safe value.

36. For an internal combustion enging having a manual control lever, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to engine speed and to the rate of air flow through said engine, for varying the opening of said valve to regulate the rate of fuel flow in accordance with said speed and rate of air flow so as to maintain a constant engine speed, corresponding to any operating position of said control lever, irrespective of engine operating conditions that affect said speed and rate of air flow.

37. For an internal combustion engine, in combination with a constant delivery fuel pump connected by a conduit to said engine, a fuel control apparatus connected in fuel flow series with said conduit and comprising: a valve in fuel flow series in said apparatus for regulating the fuel flow to said engine, means for maintaining a constant metering head on said valve, irrespective of variations in fuel pressure in said conduit, and means, actuated by an hydraulic control pressure responsive to any movement of said lever, to engine speed and to an air pressure in said engine, for varying the opening of said valve so that the rate of fuel flow is controlled by any position of said lever and is modified in accordance with variations in said speed and pressure and thereby compensated for such variations.

38. For an internal combustion engine having a manual control lever, in combination with a constant delivery fuel pump connected by a conduit to said engine, a fuel control apparatus connected in fuel flow series with said conduit and comprising: a valve in fuel flow series with said apparatus for regulating the fuel flow to said engine, means for maintaining a constant metering head on said valve, irrespective of variations in fuel pressure in said conduit, and means, actuated by an hydraulic control pressure responsive to any movement of said lever, to engine speed, to an air pressure in said engine, and to the density of air entering said engine, for varying the opening of said valve so that the rate of fuel flow is controlled by any position of said lever and is modified in accordance with variations in said speed, pressure and density and thereby compensated for such variations.

References Cited in the file of this patent

UNITED STATES PATENTS

| Number | Name | Date |
|---|---|---|
| 2,219,994 | Jung | Oct. 29, 1940 |
| 2,224,472 | Chandler | Dec. 10, 1940 |
| 2,341,257 | Wünsch | Feb. 8, 1944 |
| 2,422,808 | Stokes | June 24, 1947 |
| 2,469,678 | Wyman | May 10, 1949 |
| 2,470,382 | Vanni | May 17, 1949 |
| 2,515,074 | Bobier | June 11, 1950 |
| 2,531,780 | Mock | Nov. 28, 1950 |
| 2,573,724 | Neal | Nov. 6, 1951 |
| 2,581,276 | Mock | Jan. 1, 1952 |
| 2,604,756 | Greenland | July 29, 1952 |
| 2,622,393 | Edwards et al. | Dec. 23, 1952 |

FOREIGN PATENTS

| Number | Country | Date |
|---|---|---|
| 603,884 | Great Britain | June 24, 1948 |